United States Patent

[11] 3,631,911

[72] Inventor Henri Verdier
Puy-de-Dome, France
[21] Appl. No. 883,567
[22] Filed Dec. 9, 1969
[45] Patented Jan. 4, 1972
[73] Assignee Compagnie Generale des Etablissements Michelin raisen sociale Michelin & Cie Clermont-Ferrand (Puy-de-Dome), France
[32] Priority Dec. 13, 1968
[33] France
[31] 178332

[54] PNEUMATIC TIRE
12 Claims, 7 Drawing Figs.
[52] U.S. Cl. .................................................... 152/216
[51] Int. Cl. .................................................... B60c 11/10
[50] Field of Search ........................................... 152/209, 210

[56] References Cited
UNITED STATES PATENTS
2,004,036 6/1935 Coenning .................. 152/209 R
1,559,450 10/1925 Oakley ...................... 152/209 R
2,704,564 3/1955 Christensen .................. 152/210
FOREIGN PATENTS
604,376 2/1959 Italy ............................ 152/209 R Primary Examiner—James B. Marbert
Attorney—Brumbaugh, Graves, Donohue & Raymond ABSTRACT: A tire has a tread formed with a plurality of buttons in relief, each button comprising an inner unit and an associated outer unit surrounding the inner unit and separated therefrom by an associated separating cavity. Each inner unit exceeds its associated outer unit in height so as to have in relation to its associated outer unit a projecting portion. The volume of the projecting portion equals at most the volume of the associated separating cavity. The buttons are made by an injection-molding process.

PATENTED JAN 4 1972

3,631,911

INVENTOR
HENRI VERDIER

BY Brumbaugh, Graves, Donohue & Raymond his ATTORNEYS

PNEUMATIC TIRE

BACKGROUND OF THE INVENTION

This invention relates to improvements in tires, whether new or retreaded, and, more particularly, to improvements in the treads of tires intended to be used especially for driving on snow-covered and icy roads and to a method of making the improved tires.

Snow tire treads that have been in use heretofore are generally provided with spikes, buttons or studs that project. These projecting contact elements have a small surface of contact with the road in order to exert a high pressure (force per unit area) on the road covering of ice or snow so as to be able to penetrate the road-covering and grip the road. One consequence of the small surface of contact is that the contact elements wear off rapidly and are torn off easily, causing damage to the tread. In addition, even when they function as intended, they damage the roads, especially since most of the mileage of a snow tire is likely to be accumulated on roads free of snow and ice.

SUMMARY OF THE INVENTION

An object of the present invention is to remedy the deficiencies of conventional snow tires noted above and, more particularly, to preserve their advantages, avoid their disadvantages and increase their effectiveness on icy and snow-covered roads while adapting them to tires of current carcass design, including tires of the radial-carcass type.

The foregoing and other objects are attained in accordance with the invention by the provision of a snow tire provided with a tread comprising buttons (elements in relief). Each button is characterized by an inner unit and an outer unit surrounding the inner unit and separated therefrom by a ring-shaped cavity. The inner unit projects beyond the outer unit, and the volume of the projecting portion of the inner unit equals at most the volume of the cavity separating the inner unit and the outer unit.

Preferably, the volume of the portion of the inner unit that projects beyond the outer unit ranges from 0.5 to 1.0 times the volume of the separating cavity.

The buttons thus defined may be distributed over the tread in various ways. For example, they may be arranged on the tread singly, each standing in isolation from the others. It is better, however, that they be connected with one another, either by providing connecting elements in relief or by arranging the buttons in rows of contiguous buttons. By preference, one uses longitudinal rows of adjoining buttons, in any pattern whatever: i.e., with or without alignment, whereby these longitudinal rows form one or more ridges separated by furrows or grooves.

In accordance with the invention, the inner units of the buttons, or some of such units, may have pockets in which are set ice studs. These inner units may also have recesses of any shape whatever whereby adherence of the tire to the surface on which it rolls is improved.

Furthermore, it is recommended that the total ground-engaging surface of the elements in relief range from 45 to 70 percent of the total area of contact of the tire with the ground.

BRIEF DESCRIPTION OF THE DRAWING

An understanding of additional aspects of the invention can be gained from a consideration of the following detailed description of several representative embodiments thereof in conjunction with the appended figures of the drawing, wherein.

DESCRIPTION OF THE PREFERRED EMBODIMENTS

Figure 2:
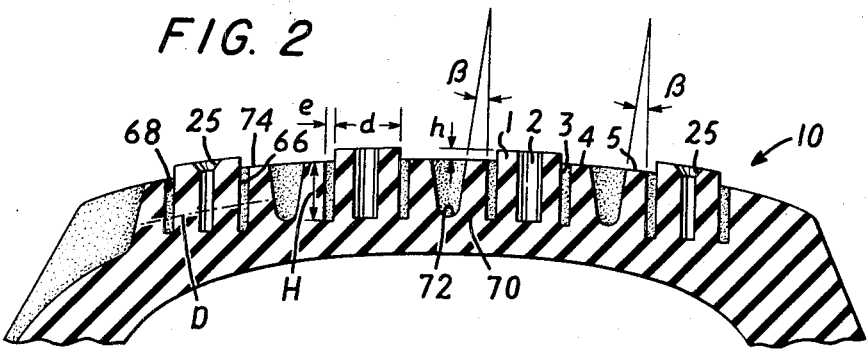
FIG. 2 is a vertical section of the tread of FIG. 1 substantially along the line 2-2 of FIG. 1 and looking in the direction of the arrows.
Figure 1:
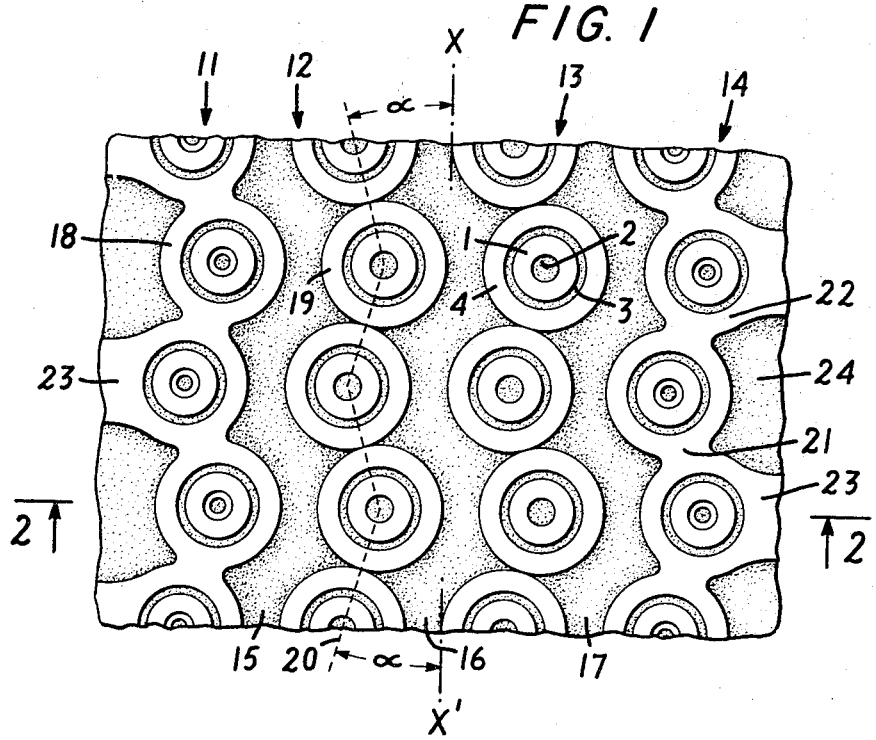
FIG. 1 is a developed plan view of a portion of a tire tread in accordance with the invention delimited by an angle about the tire axis of approximately 15°.

In FIGS. 1 and 2, the button such as 19 of the tread 10 comprises an inner unit 1 with an axial recess 2, a separating ring-shaped cavity 3 and an outer ring-shaped unit 4. The mean profile of the tread when the units 1 are deformed by contact with the ground is located at the level 5. The inner unit 1 when not deformed by contact with the ground projects beyond the level 5 by a height $h$ ranging from $h=0.2\ H$ to $h=0.3\ H$, where $H$ is the depth of the cavity 3.

FIG. 1 shows four peripheral rows 11, 12, 13 and 14 of buttons such as 18 or 19 separated by three grooves 15, 16 and 17. The median line 20 of each ridge row is a broken line, each peak of the broken line 20 coinciding with the axis of symmetry of a button and the segments of the broken line 20 forming with the longitudinal axis X-X' of the tread angles $\alpha$ that are less than 45°. The buttons such as 19 of the ridges 12 and 13 join at the base of the truncated cone of the outer unit 4 where they merge with the massive cutout portion of the tread located immediately above the reinforcement (not shown) of the tire. The buttons such as 18 that belong to the marginal ridges 11 and 14 are connected by rubber bridges 21. The edge buttons 22 of the ridges 11 and 14 extend laterally in the form of a cross ridge 23 integral with the shoulder of the tire whereby wide free spaces 24 are arranged between adjacent edge buttons 22. In this example, the total ground-contacting surface of the elements represents 60 percent of the tread area. It will be noted that the buttons of the two center ranges 12 and 13 in FIG. 1 have cylindrical hollowed-out spaces while the hollowed-out spaces in the buttons of the two marginal ranges 11 and 14 in FIG. 1 are partly cylindrical and end in a cone 25 opening towards the outside of the tread.

Figure 3:
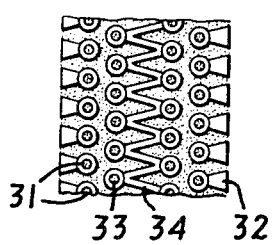
FIGS. 3-6 are fragmentary developed plan views on a smaller scale of parts of four additional treads in accordance with the invention.

FIG. 3 shows lateral buttons 31 arranged in spaced-apart relation to one another along the edges of the tread and resting against abutments 32 at the shoulders of the tire. In the center zone, there are two rows of separated buttons 33, connected by ridges 34 forming a zigzag pattern extending around the tire in a longitudinal direction.

Figure 4:
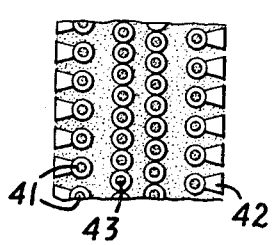

FIG. 4 shows two rows of separate buttons 41, arranged with abutments 42 along the edges of the tread. In the center part, buttons 43 are joined side-by-side to form two center longitudinal ridges.

Figure 5:
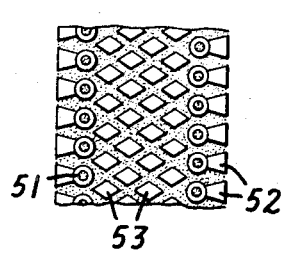

In FIG. 5, the separate buttons 51, which are reinforced by the buttresses 52, form the edge of a tread having winter moldings consisting of diamond-shaped blocks 53.

Figure 6:
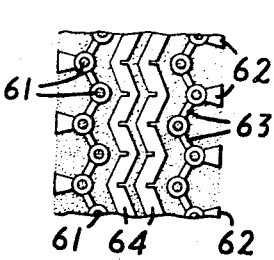

In FIG. 6, the buttons 61, bearing against the edges of the tread by means of abutments 62, are connected by ridges 63 and form the border of a tread with a molding suitable for summer or warm weather use and comprising longitudinal zigzag ridges 64.

It goes without saying that it is not beyond the scope of the invention to provide tires for use in all seasons with a tread comprising buttons such as those described above.

It might have been expected that the projecting elements in accordance with the invention, cut out in units having different heights, would result in accelerated wear of the tread, mainly on the inner units 1 emerging from the outer units 4. Experience has shown that this is not the case. The wear and tear of the two types of units is uniform, without marked preponderance of one or the other. The explanation of this phenomenon seems to be that the inner unit 1 is made to recede when it passes over the area of contact, filling the volume available in the separating cavity 3.

The inner unit 1 of each button described above, depending on whether it is situated within or outside the area of contact of the tire with the ground (the tire "footprint"), occupies a projecting position or is pushed back along its axis to a flush position and expands in a direction normal to its axis into the separating cavity 3 which it fills at least partly. Because of the incompressibility of the elastic material constituting the inner unit 1, there is first a closing off and then a filling up of the separating cavity 3, starting with the arrival in the footprint or area of contact with the ground of each button, whereby penetration by and retention of foreign matter is prevented.

Figure 2A:
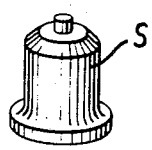
FIG. 2A is a perspective view of a stud that can be employed in a tire according to the invention.

Furthermore, on ice, the buttons when used with studs (FIG. 2A) mounted in the recesses in the inner units 1 act in three stages with decreasing pressures. First, the tops of the studs punch the ice with very high initial pressures. Thereafter, the inner-projecting units 1 in which the studs are mounted come into contact with the ice at an intermediate but still comparatively high pressure. Finally, the inner units 1 are flattened, as described above, to the level of the outer units 2 which then bear down on the ice with normal pressure.

Thanks to the invention, the initial high pressures developed under the tips of the studs ensure a very effective grip of the tread in the ice. The optimum effect is obtained by using the buttons described above with a radial-carcass-type tire, which, as is known, closely hugs the profile of the ground. However, excellent results are likewise obtained with tires of the crossed-carcass or partly radial kind.

If studded buttons are used, it becomes possible to raise or decrease simultaneously the three pressure levels described above by, for example, employing a peak reinforcement of varying rigidity or adjusting the inflation pressure of the tire.

If one considers the totality of all buttons of one tread, it becomes possible to modify the pressure thresholds of the various buttons either collectively or individually by varying either the thickness of the rubber layer placed between the bottom of the pocket accommodating the stud and the reinforcement of the tire;

or the projecting height of the inner unit 1;

or the volume of the separating cavity 3;

or the thickness of the walls of the outer units 4;

or two or more of these magnitudes at the same time.

It is also possible, without exceeding the scope of the present invention, to manufacture the inner units 1 and/or the outer units 4 from elastomers the properties of which, such as modulus of elasticity, hardness and hysteresis, are different from those of the elastomer mixture or mixtures constituting the rest of the tread.

It is desirable to execute the buttons, their inner units 1 or their outer units 4, by injection of the special mixture or mixtures indicated above, in unvulcanized condition, for example, at the time of molding preceding the vulcanization of the tire, with the tire cover already placed in the mold.

A form of execution which is both simple and especially effective comprises giving the inner button units 1 a cylindrical shape and the outer button units 4 a truncated-cone shape. Of course, it is preferred that the inner and outer units 1 and 4 be coaxial so that the cavity 3 separating them is delimited by two coaxial cylinders 66 and 68. The outer truncated unit 4 rests with its larger base 70 on the bottom 72 of the tread, and its smaller base 4 forms part of the outer surface of the tread.

In the preferred embodiment, the outer truncated units 4 have a mean outer diameter D ranging from 1.5 to 3.0 times the diameter $d$ of the inner cylindrical units. It is not necessary that the angle between the walls of the cone trunk and the cone axis be large; an angle $\beta$ of from 10° to 30° is suitable.

Furthermore, and in accordance with the invention, if $e$ designates the width of the cavity 3 separating the inner unit 1 from the outer unit 4, $H$ indicates its depth and $h$ the height of the inner unit 1 above the outer unit 4, $e$ should be larger than $$d\left(\sqrt{1+\frac{h}{H}}-1\right)$$

Of course, it is possible to achieve the advantages of the invention by giving the inner units 1, the outer units 4 and the cavities 3 separating them different shapes.

Many modifications of the representative embodiments of the invention described above will readily occur to those skilled in the art, and the invention is to be construed as including all of the embodiments thereof within the scope of the appended claims.

1. A tire having a tread formed with a plurality of buttons in relief, each button comprising an inner unit and an associated outer unit surrounding said inner unit and separated therefrom by an associated, narrow, annular, separating cavity, each inner unit exceeding its associated outer unit in height so as to have in relation to its associated outer unit a projecting portion the volume of which equals at most the volume of said associated separating cavity and equals at least a substantial fraction of the volume of said associated separating cavity, whereby each inner unit can be pushed in to a position substantially flush with the associated outer unit, each inner unit when so pushed in expanding into the associated separating cavity in such a manner as to be supportable by the associated outer unit to prevent substantial lateral yielding.

2. A tire according to claim 1 wherein the volume of each projecting portion is within the range of 0.5 to 1.0 times the volume of the associated separating cavity.

3. A tire according to claim 1 wherein said buttons are arranged in a plurality of rows of contiguous buttons, said rows extending longitudinally of said tire and being separated from each other by groove means formed in said tread and extending longitudinally of said tire.

4. A tire according to claim 1 wherein at least some of said inner units are formed with pockets, further comprising ice studs mounted in said pockets.

5. A tire according to claim 4 wherein at least some of said inner units are formed with additional hollowed-out spaces.

6. A tire according to claim 1 wherein the total ground-contacting surface of said buttons ranges from 45 to 70 of the total area of contact of the tire with the ground.

7. A tire according to claim 1 wherein the total ground-contacting surface of said buttons is about 60 percent of the total surface of the tread.

8. A tire according to claim 1 wherein said inner units are cylindrical and said outer units are in the shape of truncated cones coaxial with said inner units and having their large bases on the bottom of said tread.

9. A tire according to claim 8 wherein the average diameter of said outer units ranges from 1.5 to 3.0 times the diameter of said inner units.

10. A tire according to claim 8 wherein the ratio of the height of said projecting portion to the depth of the associated separating cavity ranges from 0.2 to 0.3.

11. A tire according to claim 1 comprising a carcass that is at least partly radial.

12. A method of making a tire having a tread formed with a plurality of buttons in relief, each button comprising an inner unit and an associated outer unit surrounding said inner unit and separated therefrom by an associated, narrow, annular, separating cavity, each inner unit exceeding its associated outer unit in height so as to have in relation to its associated outer unit a projecting portion the volume of which equals at most the volume of said associated separating cavity and equals at least a substantial fraction of the volume of said associated separating cavity, whereby each inner unit can be pushed in to a position substantially flush with the associated outer unit, each inner unit when so pushed in expanding into the associated separating cavity in such a manner as to be supportable by the associated outer unit to prevent substantial lateral yielding, comprising the steps of placing in a vulcanizing mold having mold dies a vulcanizable tire whose tread is devoid of buttons, then forming at least a portion of each of said buttons by injection-molding of an elastomeric vulcanizable material, and finally vulcanizing said tire, whereby the portion of the buttons which has not been formed by injection-molding is molded by the mold dies.

* * * * *

PO-1050
(5/69)

UNITED STATES PATENT OFFICE
CERTIFICATE OF CORRECTION

Patent No. 3,631,911　　　　　Dated　January 4, 1972

Inventor(s)　Henri Verdier

It is certified that error appears in the above-identified patent and that said Letters Patent are hereby corrected as shown below:

On the Title Page, the identification of the Assignee [73] should include the word --raison-- in place of the word "raisen".
Col. 4, line 33, "45 to 70" should be --45% to 70%--.

Signed and sealed this 13th day of June 1972.

(SEAL)
Attest:

EDWARD M. FLETCHER, JR.
Attesting Officer

ROBERT GOTTSCHALK
Commissioner of Patents